United States Patent
Amin-Sanayei et al.

(10) Patent No.: US 9,447,256 B2
(45) Date of Patent: Sep. 20, 2016

(54) METHOD OF PRODUCING FLUOROPOLYMERS USING ALKYL SULFATE SURFACTANTS

(75) Inventors: Ramin Amin-Sanayei, Malvern, PA (US); Lotfi Hedhli, Noisy le Roi (FR); Mehdi Durali, Carlsbad, CA (US); Roice A. Wille, Malvern, PA (US)

(73) Assignee: Arkema Inc., King of Prussia, PA (US)

( * ) Notice: Subject to any disclaimer, the term of this patent is extended or adjusted under 35 U.S.C. 154(b) by 71 days.

(21) Appl. No.: 14/235,484

(22) PCT Filed: Jul. 25, 2012

(86) PCT No.: PCT/US2012/048038
§ 371 (c)(1),
(2), (4) Date: Jan. 28, 2014

(87) PCT Pub. No.: WO2013/016372
PCT Pub. Date: Jan. 31, 2013

(65) Prior Publication Data
US 2014/0179868 A1     Jun. 26, 2014

Related U.S. Application Data

(60) Provisional application No. 61/512,607, filed on Jul. 28, 2011.

(51) Int. Cl.
| C08K 5/41 | (2006.01) |
| C08K 5/43 | (2006.01) |
| C08F 2/28 | (2006.01) |
| C08F 214/22 | (2006.01) |
| C08F 2/26 | (2006.01) |
| C08F 6/16 | (2006.01) |

(52) U.S. Cl.
CPC . *C08K 5/41* (2013.01); *C08F 2/26* (2013.01); *C08F 2/28* (2013.01); *C08F 6/16* (2013.01); *C08F 214/22* (2013.01)

(58) Field of Classification Search
USPC .................................. 524/745, 544
See application file for complete search history.

(56) References Cited

U.S. PATENT DOCUMENTS

| 2,460,573 A | 2/1949 | Folt |
| 3,249,595 A | 5/1966 | Lederer et al. |
| 4,524,197 A | 6/1985 | Khan |
| 5,763,552 A * | 6/1998 | Feiring ................. C07C 17/269 526/214 |
| 5,854,364 A | 12/1998 | Senninger et al. |
| 6,352,764 B1 | 3/2002 | Andrus, Jr. et al. |
| 6,365,684 B1 | 4/2002 | McCarthy et al. |
| 6,680,357 B1 | 1/2004 | Hedhli et al. |
| 6,706,193 B1 | 3/2004 | Burkard et al. |
| 6,869,997 B2 | 3/2005 | Wille et al. |
| 7,414,084 B2 | 8/2008 | Yamaguchi et al. |
| 2004/0176554 A1* | 9/2004 | Ishida ................. C08F 214/186 526/242 |
| 2005/0255320 A1* | 11/2005 | Noguchi ............... C08F 283/12 428/403 |
| 2009/0186986 A1 | 7/2009 | Nomura et al. |
| 2010/0304270 A1 | 12/2010 | Amin-Sanayei et al. |
| 2011/0034632 A1 | 2/2011 | Hedhli |

FOREIGN PATENT DOCUMENTS

CN    1362422    8/2002

* cited by examiner

Primary Examiner — Peter D Mulcahy
Assistant Examiner — Henry Hu
(74) Attorney, Agent, or Firm — Thomas F. Roland

(57) ABSTRACT

The invention relates to methods of polymerizing fluoromonomers using non-fluorinated surfactants, in particular to emulsion polymerization method for producing fluoropolymer latex. Specifically, the method of polymerization uses one or more alkyl sulfate surfactants.

10 Claims, No Drawings

METHOD OF PRODUCING FLUOROPOLYMERS USING ALKYL SULFATE SURFACTANTS

This application claims benefit, under U.S.C. §119 or §365 of PCT Application No. PCT/SUS2012/048038, filed Jul. 25, 2012, and US Provisional Application No. 61/512,607, filed Jul. 28, 2011, said applications incorporated herein by reference.

FIELD OF THE INVENTION

The invention relates to methods of polymerizing fluoromonomers using non-fluorinated surfactants, in particular to emulsion polymerization method for producing fluoropolymer latex. Specifically, the method of polymerization uses one or more alkyl sulfate surfactants.

BACKGROUND OF THE RELATED ART

Known processes for making fluoropolymers by an emulsion process commonly use perfluorinated or highly fluorinated surfactants to stabilize the emulsion during the reaction. For example, perfluorocarboxylate salts are used to stabilize fluoropolymer emulsion polymerizations, with the most common example being ammonium perfluorooctanoate. Fluorosurfactants are expensive, specialized materials, however, and because of their high stability, they tend to persist in the environment and now are under scrutiny of regulatory agencies. A process which uses a non-fluorinated surfactant to make fluoropolymers could solve these problems. In general, non-fluorinated surfactants have been used in emulsion polymerization of non-fluorinated monomers, while they had very limited success in conjunction with fluorinated monomers because they induce long inhibition time, low yield, and low molecular weight.

BRIEF SUMMARY OF THE INVENTION

The present invention provides a process for preparing a fluoropolymer in an aqueous reaction medium, comprising a) forming an aqueous emulsion comprising at least one alkyl sulfate surfactant and at least one fluoromonomer; and b) initiating polymerization of said fluoromonomer. A polymerization reaction in accordance with the present invention may be carried out by charging a reactor with water (preferably deionized water), at least one surfactant, and at least one fluoromonomer. The process may include at least one initiator, at least one chain-transfer agent, and/or at least one antifoulant. The at least one alkyl sulfate surfactant has a structure selected from R—SO$_4$M, and MO$_4$S—R—SO$_4$M; where R is a hydrocarbon group, and M is a monovalent cation selected from the group consisting of hydrogen ions, alkali metal ions, ammonium ions, and monoalkyl, dialkyl, trialkyl, and tetraalkyl ammonium ions, with the alkyl parts of the monoalkyl, dialkyl, trialkyl, or tetraalkyl ammonium ions each having one to four carbon atoms. Preferably, the at least one alkyl sulfate surfactant is selected from the group consisting of sodium laurel sulfate, potassium laurel sulfate, ammonium laurel sulfate, and mixtures thereof.

In another embodiment, the present invention provides a process for preparing a fluoropolymer in an aqueous reaction medium, comprising a) forming an aqueous emulsion comprising a first at least one alkyl sulfate surfactant, at least one fluoromonomer, and optionally an initiator; b) initiating polymerization of said fluoromonomer; and c) continuously feeding a second at least one alkyl sulfate surfactant (which may be the same as or different from the first at least one alkyl sulfate surfactant) to the reaction medium. The aqueous emulsion may initially contain from about 0.1 wt % to about 20.0 wt % of the total alkyl sulfate surfactant present in the final reaction medium, with the remainder of the total alkyl sulfate surfactant continuously fed to the reaction medium after polymerization is initiated.

Another embodiment of the present invention provides a process for preparing a stable fluoropolymer in an aqueous reaction medium, comprising a) forming an aqueous emulsion comprising a first at least one non-ionic surfactant, at least one fluoromonomer, and optionally an initiator; b) initiating polymerization of said fluoromonomer; and c) after polymerization has started, continuously feeding at least one alkyl sulfate surfactant during the reaction. The ratio of total alkyl sulfate to non-ionic surfactant present in the final reaction medium is from 0.01 to 10, preferably from 0.05 to 5.

In yet another embodiment of the present invention, a process for preparing a fluoropolymer in an aqueous reaction medium comprises a) forming an aqueous emulsion comprising at least one fluoromonomer and an initiator; b) initiating polymerization of said fluoromonomer; and c) adding at least one alkyl sulfate surfactant after polymerization is concluded. The at least one alkyl sulfate surfactant is preferably selected from the group consisting of sodium laurel sulfate, potassium laurel sulfate, ammonium laurel sulfate, and mixtures thereof.

It has unexpectedly been discovered that the presence of an alkyl sulfate surfactant during emulsion polymerization of a fluoromonomer permits the amount of fluorosurfactant usually necessary to achieve satisfactory polymerization results to be significantly reduced while yielding comparable or improved yields of fluoropolymer. While non-fluorinated surfactants have been used in the art to carry out emulsion polymerizations, they have not been able to produce fluoropolymer yields comparable to processes employing fluorinated surfactants, which are known to stabilize the emulsion during the reaction. Use of the alkyl sulfate surfactants, as shown in the embodiments and examples of the present invention, provides surprising results in that such surfactants are not known to produce fluoropolymer yields comparable to those obtained using fluorinated surfactants. Additionally, it is surprising and unexpected that the alkyl sulfate surfactant may be added prior to polymerization, during polymerization stage, and/or alternatively, at a stage after polymerization with equivalent fluoropolymer yield.

DETAILED DESCRIPTION OF CERTAIN EMBODIMENTS OF THE INVENTION

A polymerization reaction in accordance with the present invention may be carried out by charging a reactor with water (preferably deionized water), at least one surfactant, at least one fluoromonomer and optionally, a chain-transfer agent and/or an antifoulant. Air may be purged from the reactor prior to the introduction of the fluoromonomer. Water generally is added to the reactor before bringing the reactor to the desired starting temperature, but the other materials may be added before or after bringing the reactor to temperature. At least one radical initiator is added to start and maintain the polymerization. Additional monomer may be optionally added to replenish monomer that is consumed, and the other materials may be optionally added during the course of the polymerization to maintain the reaction and control the final product properties.

Surfactant

The term "surfactant" means a type of molecule which has both hydrophobic and hydrophilic, portions, which allows it to stabilize and disperse hydrophobic molecules and aggregates of hydrophobic molecules in aqueous systems. A preferred group of surfactants for fluoropolymer synthesis according to the embodiments of the present invention includes alkyl sulfate surfactants. The term "alkyl sulfate surfactants" means surfactants having hydrocarbon groups as their hydrophobic portion, preferably linear hydrocarbon groups containing linear $C_{6-20}$ groups. The hydrocarbon groups of these alkyl sulfate surfactants are functionalized with one or two sulfate groups, as their hydrophilic portion. The hydrocarbon group does not contain any fluorine (F). Examples of such alkyl sulfate surfactants include, but are not limited to, sodium lauryl sulfate, potassium lauryl sulfate, and ammonium lauryl sulfate. Mixtures of different alkyl sulfate surfactants may be employed.

Representative alkyl sulfate surfactants suitable for use in the invention include, but are not limited to, compounds having the following structures:

R—SO$_4$M; and
MO$_4$S—R—SO$_4$M;

where R is the hydrocarbon group, and where M is a monovalent cation selected from the group consisting of hydrogen ions, alkali metal ions, ammonium ions and monoalkyl, dialkyl, trialkyl, and tetraalkyl ammonium ions, with the alkyl parts of the monoalkyl, dialkyl, trialkyl, or tetraalkyl ammonium ions each having one to four carbon atoms. The surfactants may be used as mixtures with one another. Preferred alkyl sulfate surfactants are in salt form. Especially preferred alkyl sulfate surfactants are the ammonium, sodium, or potassium salts of dodecyl sulfate such as, for example sodium lauryl sulfate.

The alkyl sulfate surfactants are used in an amount from about 0.01 to about 1.0 weight percent on total monomer. Preferably they are used in an amount from about 0.01 to about 0.5 weight percent on total monomer. Generally speaking, lower concentrations of alkyl sulfate surfactant are preferred in order to avoid inhibition of the desired fluoromonomer polymerization reaction. For example, in various embodiments of the invention, the surfactant concentration in the reaction medium is less than 1000 ppm, less than 800 ppm, less than 600 ppm, or less than 500 ppm, based on the total weight of all components present in the reaction medium. The surfactants may be used in solution such as in aqueous solution for convenient handling.

In one embodiment of the invention, no type of surfactant other than an alkyl sulfate surfactant is employed in the fluoromonomer polymerization process. In particular, the present invention provides a method for polymerizing fluoromonomers in which no or essentially no fluorinated surfactant is present during polymerization. However, in other embodiments of the invention, relatively minor amounts of one or more surfactants other than alkyl sulfate surfactants are utilized. Preferably any other surfactant is non-fluorinated. Generally speaking, at least 50%, at least 75% or at least 90% by weight of the total amount of surfactant employed in the process is alkyl sulfate surfactant.

Fluoromonomers

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The thermoplastic polymers typically exhibit a crystalline melting point.

Fluoromonomers useful in the practice of the invention include, for example, vinylidene fluoride (VDF or VF$_2$), tetrafluoroethylene (TFE), trifluoro ethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene, fluorinated vinyl ethers, fluorinated allyl ethers, non-fluorinated allyl ethers, fluorinated dioxoles, and combinations thereof. Fluoropolymers useful in the practice of the present invention include the products of polymerization of the fluoromonomers listed above, for example, the homopolymer made by polymerizing vinylidene fluoride (VDF) by itself. Copolymers, terpolymers and higher polymers of the fluoromonomers listed above, such as for example a higher polymer of vinylidene fluoride, may also be suitable employed in the practice if the invention.

In embodiments which provide a VDF copolymer, the vinylidene fluoride units may comprise greater than 10 percent of the total weight of all the monomer units in the copolymer, and more preferably, comprise greater than 70 percent of the total weight of the units. Copolymers, terpolymers and higher polymers of vinylidene fluoride may be made by selecting, for example, one or more additional monomers from the group which includes, for example, vinyl fluoride, trifluoroethene, tetrafluoroethene (TFE), and hexafluoropropene (HFP). Further copolymers, terpolymers and high polymers of vinylidene fluoride (VDF or VF$_2$) may be made by reacting vinylidene fluoride with one or more monomers from the group which includes, for example, vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

Copolymers made by the process of the invention include the copolymers of VDF with TFE, HFP, or trifluoroethylene. Preferred copolymers may be those which comprise from about 71 to about 99 weight percent VDF, and correspondingly comprise from about 1 to about 29 weight percent TFE, HFP, or trifluoroethylene. Terpolymers made by the process of the invention include the terpolymer of VDF, HFP, and TFE, and the terpolymer of VDF, trifluoroethene, and TFE. Preferred terpolymers may be those which comprise at least 71 weight percent VDF, and the other comonomers may be present in varying portions which combine to comprise up to 29 weight percent of the terpolymer.

Initiators

The term "initiator" and the expressions "radical initiator" and "free radical initiator" refer to a chemical that is capable of providing a source of free radicals, either induced spontaneously, or by exposure to heat or light. Examples of suitable initiators include peroxides, peroxydicarbonates and azo compounds. "Initiators" also includes redox systems useful in providing a source of free radicals. The term "radical" and the expression "free radical" refer to a chemical species that contains at least one unpaired electron. The radical initiator is added to the reaction mixture in an amount sufficient to initiate and maintain the polymerization reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) may, for example, be from about 0.005 to about 1.0 weight percent.

The radical initiator may comprise an organic peroxide such as an alkyl, dialkyl, or diacyl peroxide, a peroxydicarbonate, or a peroxy ester. A preferred dialkyl peroxide is di-tert-butylperoxide (DTBP), which is added to the reaction mixture in an amount from about 0.01 to about 5 weight percent on total monomer, and is preferably added in an amount from about 0.05 to about 2.5 weight percent on total monomer. Preferred peroxydicarbonate initiators are di-n-propyl peroxydicarbonate (NPP) and diisopropyl peroxydicarbonate, which are added to the reaction mixture in an amount from about 0.5 to about 2.5 weight percent on total monomer. Peroxy ester initiators include tert-amyl peroxypivalate, tert-butyl peroxypivalate, and succinic acid peroxide. The radical initiator may alternatively comprise an azo initiator, such as 2,2'-azobis(2-methylpropionamidine) dihydrochloride.

The radical initiator may comprise a redox system. "Redox system" is understood by on having ordinary skill in the art to mean a system comprising an oxidizing agent, a reducing agent and optionally, a promoter as an electron transfer medium. Oxidizing agents include, for example, persulfate salts; peroxides, such as hydrogen peroxide; hydroperoxides such as tert-butyl hydroperoxide and cumene hydroperoxide; and oxidizing metal salts such as, for example, ferric sulfate. Reducing agents include, for example, sodium formaldehyde sulfoxylate, sodium and potassium sulfite, ascorbic acid, bisulfite, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. In redox systems, the oxidizing agent and the reducing agent may be utilized in an amount from about 0.01 to about 0.5 weight percent on total monomer. The optional promoter may be utilized in an amount from about 0.005 to about 0.025 weight percent on total monomer. Redox systems are described, for example, in G. S. Misra and U. D. N. Bajpai, *Prog. Polym. Sci.*, 1982, 8(1-2), pp. 61-131.

Chain-Transfer Agents

Chain-transfer agents are added to the polymerization to regulate the molecular weight of the product. They may added to a polymerization in a single portion at the beginning of the reaction, or incrementally or continuously throughout the reaction. The amount and mode of addition of chain-transfer agent depend on the activity of the particular chain transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Oxygenated compounds such as alcohols, carbonates, ketones, esters, and ethers may serve as chain-transfer agents. Examples of oxygenated compounds useful as chain-transfer agents include isopropyl alcohol, as described in U.S. Pat. No. 4,360,652. Other classes of compounds which may serve as chain-transfer agents in the polymerization of halogen-containing monomers include, for example, halocarbons and hydrohalocarbons, such as chlorocarbons. Alkanes such as ethane and propane may also function as chain-transfer agents.

Other classes of compounds which may serve as chain-transfer agents in the polymerization of halogen-containing monomers include, for example, halocarbons and hydrohalocarbons, such as chlorocarbons, hydrochlorocarbons, chlorofluorocarbons and hydrochlorofluorocarbons. Examples of such chain-transfer agents include trichlorofluoromethane, as described in U.S. Pat. No. 4,569,978; and 1,1-dichloro-2,2,2-trifluoroethane. In addition, ethane and propane may serve as chain-transfer agents in the polymerization of halogen-containing monomers.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction. In one preferred embodiment, the initiator feed comprises approximately equal weights of potassium persulfate and sodium acetate in aqueous solution.

Antifoulant

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

Polymerization Conditions

The temperature used for polymerization may vary, for example, from 20-160 degrees Celsius, depending on the initiator system chosen and the reactivity of the fluoromonomer(s) selected. The polymerization temperature is preferably from 35-130 degrees Celsius, and most preferably from 65-95 degrees Celsius.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring or agitation. The stirring may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more alkyl sulfate surfactants in accordance with the invention and at least one fluoromonomer. The mixture may optionally contain one or more of an antifoulant and a chain-transfer agent for molecular weight regulation of the polymer product. Other materials may be added to the process such as, for example, initiators and buffering agents, to initiate and maintain necessary conditions for the polymerization reaction.

Prior to introduction of the monomer or monomers, air is preferably removed from the reactor in order to obtain an oxygen-free environment for the polymerization reaction. The reactor may be purged with a neutral gas such as, for example, nitrogen or argon.

The order in which the polymerization components are assembled may be varied. In one embodiment, at least a portion of the alkyl sulfate surfactant is present in the aqueous reaction. medium prior to the initiation of the polymerization of the fluoromonomer. An additional amount of alkyl sulfate surfactant may be fed to the reactor during the reaction. In another embodiment, a surfactant other than an alkyl sulfate surfactant is present in the aqueous reaction medium prior to initiation of polymerization.

In one embodiment, water, alkyl sulfate surfactant, fluoromonomer and optionally antifoulant, chain transfer agent, initiator, and/or buffer are charged to the reactor, and the reactor heated to the desired reaction temperature. The fluoromonomer(s) is(are) then fed into the reactor, preferably at a rate which provides an essentially constant pressure. Alternatively the fluoromonomer and alkyl sulfate surfactant can be fed to the reactor, along with one or more of the optional ingredients. Other variations for fluoropolymer polymerization processes are contemplated, as known in the art.

The fluoromonomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the fluoropolymer is then recovered from the reactor as a latex. The latex consists of a stable mixture of the reaction components, i.e., water, alkyl sulfate surfactant, initiator (and/or decomposition products of the initiator) and fluoropolymer solids. Generally, the latex contains from about 1 to about 99 weight percent polymer solids, preferably from 10 to 60 weight percent solids. The polymer in the latex is in the form of small particles having a weight average particle size range of from about 1 nm to about 500 nm, preferably from 5 to 400 nm, and more preferably from 10 to 299 nm.

In a further embodiment of the present invention, water, at least one alkyl sulfate surfactant, at least one fluoromonomer, and optionally an initiator, are charged to the reactor, and the reactor is heated to a desired reaction temperature. Only a small amount of the total alkyl sulfate surfactant is charged to the reactor, with the remainder of the alkyl sulfate surfactant added by continuous feed to the reactor. The initial amount of the alkyl sulfate surfactant charged to the reactor is between about 0.1 to about 20.0 wt % of the total alkyl sulfate surfactant to be introduced to the reaction.

Accordingly, the process for producing fluoropolymers according to at least this embodiment of the present invention aims to keep the reaction rate slow and control polymerization of the fluoromonomers.

In yet another embodiment of the present invention, water, at least one alkyl sulfate surfactant, at least one fluoromonomer, and optionally an initiator, are charged to the reactor, and the reactor is heated to a desired reaction temperature. A co-surfactant, such as a second alkyl sulfate surfactant, may be added by continuous feed to the reactor. The co-surfactant may be the same as the alkyl sulfate surfactant employed at the initial reactor charge, or a different alkyl sulfate surfactant.

In still another embodiment of the present invention, water, at least one surfactant other than an alkyl sulfate surfactant, at least one fluoromonomer, and optionally an initiator, are charged to the reactor, and the reactor is heated to a desired reaction temperature. An alkyl sulfate surfactant or mixture of alkyl sulfate surfactants is added to the reactor after polymerization has been initiated, for example in a continuous or portion-wise feed.

Product Handling

The product of the polymerization is a latex which can be used in that form, usually after filtration of solid byproducts from the polymerization process, or which can be coagulated to isolate the solids, which may then be washed and dried. For use in latex form, the latex can be stabilized by the addition of further surfactant, which may be the same surfactant present during polymerization or a different surfactant from that present during polymerization. For example, the further surfactant may be an alkyl sulfate surfactant or another type of ionic or non-ionic surfactant. For a solid product, the latex may be coagulated mechanically or by the addition of salts or acids, and then isolated by well-known means such as by filtration. Once isolated, solid product can be purified by washing or other techniques, and it may be dried for use as a powder, which can be further process into granules.

In another embodiment of the present invention, an alkyl sulfate surfactant is alternatively or additionally added to the reactor during the finishing stage of the process. The finishing stage of the process takes the latex containing the polymer solids and performs additional steps, including, for example, the coagulating, washing, thickening, and drying steps described above. The alkyl sulfate surfactant added at the finishing stage may be the same as the alkyl sulfate surfactant employed during the polymerization process, or a different alkyl sulfate surfactant. In one embodiment, a surfactant other than an alkyl sulfate surfactant is employed during polymerization, with an alkyl sulfate surfactant only being introduced into the reaction mixture after polymerization has ceased or has been halted. While any surfactant may be used, preferably only non-fluorinated surfactants are used in the fluoropolymer polymerization step. Useful non-fluorinated surfactants include, but are not limited to, non-ionic block copolymers with formula of $T_1$-[($CH_2$—$CH_2$—O—)$_x$]$_m$-[($CH_2$—C($CH_3$)—O—)$_Y$]$_n$-[($CH_2$—$CH_2$—$CH_2$—$CH_2$—O—)$_Z$]$_k$-$T_2$ where, X, Y, and Z are between 2 to 200; and m, n, k are from 0 to 5, $T_1$ and $T_2$ are terminal groups selected from hydrogen, hydroxyl, carboxyl, ester, ether and/or hydrocarbon. The surfactant used during polymerization is present at from 10 to 1500 ppm, and preferably from 50 to 1000 ppm.

The post-addition of alkyl sulfate surfactant includes, for example, transferring the latex polymer from a polymerization stage to a coagulator where sodium laurel sulfate (SLS) surfactant may be alternatively or additionally added at a level of from 10 to 1500 ppm and preferably from 50 to 1000 ppm. The polymer and effluent from the coagulator is then fed into the bottom of a wash vessel, where the fluoropolymer is purified. Without being held to the theory, it is believed that the alkyl sulfate surfactants employed in the present invention, particularly during a finishing stage, improve the ability of the fluoropolymers to separate from the emulsion and float upwards, where they may be collected to improve the polymer yield. The weight average particle size of the fluoropolymer particles is preferably from 10 to 299 nm, more preferably from 25-200 nm.

The alkyl sulfate surfactant may be added by any method known in the art such as, for example, drop-in or injection. For example, addition of the alkyl sulfate surfactant at the polymerization stage may be achieved by drop-in of the surfactant into the reactor during agitation. Alternatively, or additionally, the surfactant may be added at the finishing stage by a method such as, for example, injection, dispersion, or any other method known in the art.

Although the invention is illustrated and described herein with reference to specific embodiments, the invention is not intended to be limited to the details shown. Rather, various modifications may be made in the details within the scope and range of equivalents of the claims and without departing from the invention.

The following examples are included to more clearly demonstrate the overall nature of the present invention.

EXAMPLES

General: Deionized water was used. Reagents were of ACS reagent grade quality unless stated otherwise.

Examples 1-3

A vinylidene fluoride homopolymer was made using sodium lauryl sulfate (SLS) (Aldrich) as a surfactant and potassium persulfate as an initiator. The experiments were carried out in a 25 ml reactor (Endeavor reactor from Argonaut). 480 micro liters of a 0.25 wt % aqueous surfactant solution (i.e., 300 ppm) and 250 micro liters of a 1 wt % aqueous solution of potassium persulfate (i.e., 625 ppm) were added to the reactor. Deionized water was added to the reactor to bring the total reactor charge to 4 g. The reactor was purged with nitrogen gas. The reactor was sealed and agitated at 500 rpm. Agitation was maintained throughout the experiment. The reactor was heated to 83° C. The reactor was charged with vinylidene fluoride ($VF_2$) until a pressure of 490 psi was reached. The reaction conditions were maintained at 83° C. and 490 psi by adding vinylidene fluoride as needed. When the amount of $VF_2$ consumed reached the desired level, the $VF_2$ feed was stopped. Agitation was continued for 30 minutes while the temperature was maintained, after which agitation and heating were discontinued allowing the reactor to cool to room temperature. After cooling to room temperature, surplus gas was vented, and the latex was recovered. Gravimetric solids measurements of the latex were done. The examples are summarized in Table 1.

Comparative Examples 4-5

Examples 4 and 5 were made according to the protocol described above for Examples 1-3, except using a perfluorinated carboxylic acid as the surfactant instead of the sodium lauryl sulfate (SLS). Specifically, a perfluorononanoic acid sold under the trade name "Surflon S-111" by Asahi Glass was used as the surfactant for comparison in Examples 4 and 5 instead of the sodium lauryl sulfate (SLS) used in Examples 1-3.

TABLE 1

Example of using sodium lauryl sulfate (SLS) used as sole surfactant in VDF polymerization. Initiator is potassium persulfate and used at 625 ppm level.

| Example | Surfactant | Surfactant Amount (ppm) | Initiator | Initiator Amount (ppm) | Solids, wt % |
|---|---|---|---|---|---|
| 1 | SLS | 1200 | Potassium persulfate | 1500 | 0 |
| 2 | SLS | 600 | Potassium persulfate | 1500 | 8.3 |
| 3 | SLS | 480 | Potassium persulfate | 1500 | 16.0 |
| 4 | SURFLON S-111 | 1200 | Potassium persulfate | 1500 | 12.5 |
| 5 | SURFLON S-111 | 1200 | Potassium persulfate | 1500 | 18.0 |

As Table 1 above shows, when SLS was used at similar levels as the fluorinated surfactant, namely 1200 ppm, there was no reaction. As the level of SLS was decreased from 1200 ppm to 480 ppm, a reaction occurred and the reactions using SLS produced similar yields to the reactions using a fluorinated surfactant. This shows that the inhibition or chain transfer resulting from the SLS surfactant can be overcome by using lower amounts of SLS surfactant compared to conventional recipes which use fluorosurfactants.

Example 6

A vinylidene fluoride homopolymer was made using ammonium lauryl sulfate surfactant of 98 wt % activity and di-N-propyl peroxy dicarbonate (NPP) initiator. 800 g of water and 1.0 g of a 30 wt % aqueous ammonium lauryl sulfate surfactant solution from Stepan (sold under the trade name "Polystep B7") were added to a 2 liter, stainless steel reactor. The mixture was purged with argon and agitated for 30 minutes. The reactor was sealed, agitation was continued, and the reactor was heated to 83° C. The reactor was charged with 170 g of vinylidene fluoride ($VF_2$). The reactor temperature stabilized at 83° C., with the reactor pressure at 4500 kPa. An initiator emulsion consisting of 11.3 g of NPP, 360 g water and 0.9 g of Geropon 690 from Genessee Polymers was fed throughout the reaction at 2 g/minute for the first 20 minutes then 1.1 g/minute for the reminder of the reaction until 200 g total initiator emulsion was added. The reaction temperature was held at 83° C., and the reaction pressure was maintained at 4480 kPa by adding vinylidene fluoride as needed. After 180 minutes, the feed of vinylidene fluoride was stopped. For a period of 20 minutes, agitation was continued and the temperature was maintained. The agitation and heating were then discontinued. After cooling to room temperature, surplus gas was vented, and the reactor was emptied of latex through a stainless steel mesh. Gravimetric solids measurements of the latex showed the solid polymer yield to be 22.0 wt %.

Example 7

A vinylidene fluoride homopolymer was made using ammonium lauryl sulfate surfactant of 98 wt % activity and di-N-propyl peroxy dicarbonate (NPP) initiator. The 1 wt % aqueous surfactant solution used in this experiment, and referred to as "surfactant solution," contained 56 g of Rhodapon L22-STD solution from Rhodia and 1544 g of deionized water. The initiator solution used in this experiment, and referred to as "initiator solution," contained 11.4 g of di-n-propyl peroxydicarbonate (NPP), 353 g water and 1.0 g of Geropon 690 from Genessee polymers.

4600 g of deionized water, 6.0 g of paraffin wax, and 100.0 g of surfactant solution were added to a 7.5 L, stainless steel reactor. The mixture was purged with argon and agitated for 30 minutes. The reactor was sealed, agitation was continued, and the reactor was heated to 83° C. The reactor was charged with 370 g of vinylidene fluoride ($VF_2$). The reactor temperature stabilized at 83° C., with the reactor pressure at 4500 kPa. Then 80 g of initiator solution was fed at an addition rate of 360 g/hour, followed by at an addition rate of 95 to 110 g/hour. The initiator addition rate was thereafter reduced to 70 g/hour for the reminder of the reaction until 318 g total initiator solution was added. After 30 minutes of reaction, 100 g of surfactant solution were charged at an addition rate of 36 g/hour. The reaction temperature was held at 83° C., and the reaction pressure was maintained at 4480 kPa by adding vinylidene fluoride as needed. After 2500 g of vinylidene fluoride were charged, the feed of vinylidene fluoride was stopped. Total reaction time was 180 minutes. Agitation was continued and the temperature was maintained for 20 minutes, after which the agitation and heating were discontinued. After cooling to room temperature, surplus gas was vented, and the reactor was emptied of latex. Gravimetric solids measurements of the latex showed the solid polymer yield to be 33.0 wt %.

Example 8

A vinylidene fluoride homopolymer was made using sodium lauryl sulfate (SLS) surfactant of 99 wt % activity and potassium persulfate (KPS) initiator. Other reagents were of ACS reagent grade quality. To a 7.5 liter, stainless steel reactor was added 4100 g of deionized water, 4.0 g of paraffin wax, 400 g of an aqueous surfactant solution consisting of 3.84 g of sodium dodecyl sulfate and 97.36 g water, and 300 g initiator solution containing 2.0 wt % potassium persulfate and 1.4 wt % sodium acetate. The mixture was purged with argon and agitated for 30 minutes. The reactor was sealed, agitation was continued, and the reactor was heated to 82° C. The reactor was charged with 416 g of vinylidene fluoride. The reactor temperature stabilized at 82° C., with the reactor pressure at 4611 kPa. After 20 minutes, an initiator feed consisting of 2.0 wt. % potassium persulfate and 1.4 wt. % sodium acetate was started at 30 g/hr. After 1.05 hour, initiator feed rate was increased to 60 g/hr and after 1.2 hour the feed rate was raised to 90 g/hr. The reaction temperature was held at 82° C., and the reaction pressure was maintained at 4480 kPa by adding vinylidene fluoride as needed. After 3.17 hours, the feed of vinylidene fluoride was stopped. During this period 2200 g vinylidene fluoride had been added to the reactor. For a period of 0.30 hours, initiator feed was stopped, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 88.11 wt % based on the total weight of the vinylidene fluoride fed to the reactor.

Example 9

A vinylidene fluoride homopolymer was made using sodium lauryl sulfate (SLS) surfactant of 99 wt % activity and potassium persulfate (KPS) initiator at a higher reaction temperature (121° C. instead of 82° C.).

To a 7.5 liter, stainless steel reactor was added 4330 g of deionized water, 4 g of paraffin wax, 100 g of an aqueous surfactant solution consisting of 0.45 g of sodium dodecyl sulfate and 99.55 g water. The mixture was purged with argon and agitated for 30 minutes. The reactor was sealed, agitation was continued, and the reactor was heated to 120° C. The reactor was charged with 350 g of vinylidene fluoride ($VF_2$). The reactor temperature stabilized at 121° C., with the reactor pressure at 4611 kPa. An initiator feed consisting of 1.2 wt. % potassium persulfate and 0.84 wt. % sodium acetate was started at 180 g/hr until 24.1 g of initiator solution was in the reactor. At this point initiator feed rate was dropped to 36.0 g/hr. The reaction temperature was held at 121° C., and the reaction pressure was maintained at 4480 kPa by adding vinylidene fluoride as needed. After 1.0 hour, initiator feed rate was increased to 60 g/hr and, after 2.0 hours, feed rate was raised to 90 kg/hr. After 3.0 hours, the feed of vinylidene fluoride was stopped. During this period 2202 g vinylidene fluoride had been added to the reactor. For a period of 0.30 hours, initiator feed and agitation was continued and the temperature was maintained. Initiator feed was stopped but the agitation and heating were continued for another 0.17 hours after which they were discontinued. After cooling to room temperature, surplus gas was vented, and the reactor was emptied of latex through a stainless steel mesh. Gravimetric solids measurements of the latex showed the solid polymer yield to be 98.11 wt % based on the total weight of the vinylidene fluoride fed to the reactor.

Example 10

An aqueous initiator solution was prepared from 0.50 wt % potassium persulfate and 0.30 wt % sodium acetate. Aqueous surfactant solution, initiator solution, antifoulant, and additional water were added to a 7.5 liter reactor. After the additions, the amounts of the components in the reactor were 0.448 g of sodium dodecyl sulfate, 1.75 g of potassium persulfate, 1.055 g of sodium acetate, 4.0 g of paraffin wax, and 4477 g of deionized water. The reactor was purged of air by using a low flow of argon for 30 minutes and agitation at 18 rpm. After the purge, the agitation was increased to 72 rpm, and the reactor temperature was brought to 82° C. When the temperature stabilized, vinylidene fluoride was added to the reactor to bring the pressure to 650 psig, taking 350 g to bring the reactor to pressure. A continuous feed of initiator solution was begun at 0.6 g/min. Vinylidene fluoride was added as necessary to maintain the reactor pressure. After 2216 g of vinylidene fluoride had been added to the reactor, the feed of vinylidene fluoride was stopped. A react-out period was begun with continuation of the initiator solution feed for another 20 minutes, after which the initiator solution feed was stopped. Including the amounts initially added to the reactor, the total amount of potassium persulfate used was 2.26 g and the total amount of sodium acetate used was 1.36 g. The reactor was kept at 82° C. for another 10 minutes, but agitation was reduced to 50 rpm. The reactor was then cooled and vented of surplus vinylidene fluoride.

The reaction time from the beginning of the continuous initiator solution feed to the end of the react out period just before venting was 182 minutes. 6622 g of latex was obtained from the reaction with a solids content of 33.0 wt %.

Example 11

Into an 80-gallon stainless steel reactor was charged, 345 lbs of deionized water and 250 grams of Pluronic 31 R1 non-ionic surfactant (from BASF). Following evacuation, agitation was begun at 23 rpm and the reactor was heated to 100° C. After reactor temperature reached the desired set point, 0.6 lbs propane was charged into the reactor. Reactor pressure was then raised to 650 psi by charging about 35 lbs vinylidene fluoride (VDF) into the reactor. After the reactor pressure was stabilized, 5.2 lbs of an aqueous initiator solution containing 1 wt% potassium persulfate and 1 wt% sodium acetate was added to the reactor to jumpstart polymerization. The rate of further addition of initiator solution was so adjusted to obtain and maintain a VDF polymerization rate of roughly 70 pounds per hour. The VDF homopolymerization was continued until 100 lbs of VDF was fed to the reactor, at this point a 1 wt% aqueous solution of sodium lauryl sulfate (SLS) was introduced into the reactor at a ratio to monomer of 1.5%. After adding a total of 150 lbs of monomer to the reactor, and 18.3 lbs of initiator solution, all feeds were stopped. After 20 minutes, the agitation was stopped and the reactor was vented and the latex recovered. The latex had 27% solids with a particle size of 155 nm. To the final latex, a solution of SLS at a ratio to solids of 0.5% was added. Polymer resin was isolated by coagulating the latex, washing the latex with deionized water, and drying. The resin had a melt viscosity of 24 kilopoise measured at 232° C., a DSC melt point of 163-168° C.

What is claimed is:

1. A process for preparing a fluoropolymer in an aqueous reaction medium, comprising:
   a) forming an aqueous emulsion comprising at least one alkyl sulfate surfactant and one or more monomer(s), wherein said monomer or all said monomers are fluoromonomers selected from the group consisting of vinylidene fluoride (VIDF or $VF_2$), tetrafluoroethylene (TFE), trifluoroethylene, chlorotrifluoroethylene (CITE), hexafluoropropene (HFP), vinyl fluoride, hexafluoroisobutylene, perfluorobutylethylene (PFBF), pentafluoropropene, 3,3,3-tri fluoro-1-propene, 2-trifluoromethyl-3,3,3-trifluoropropene, fluorinated vinyl ethers, fluorinated allyl ethers, fluorinated dioxoles, 1,2,3,3,3-pentafluoropropene, 3,3,3,4,4-pentaftuoro-1-butene, and the combinations;
   b) initiating polymerization of said fluoromonomers, and
   c) introducing at least one alkyl sulfate surfactant to the aqueous reaction medium after polymerization and during a finishing stage to separate the fluoropolymer by floatation;
   wherein no fluorinated surfactant is present during the polymerization.

2. The process of claim 1, wherein the aqueous emulsion further comprises an initiator.

3. The process of claim 1, wherein the aqueous emulsion further comprises at least one additional component selected from the group consisting of chain-transfer agents, buffering agents, antifoulants, and mixtures thereof.

4. The process of claim 1, wherein the at least one alkyl sulfate surfactant has a structure selected from:

R—O—$SO_3$M, and $MO_4$S—R—$SO_4$M;

where R is a hydrocarbon group, and M is a monovalent cation selected from the group consisting of hydrogen ions, alkali metal ions, ammonium ions, and monoalkyl, dialkyl, trialkyl, or tetraalkyl ammonium ions, with the alkyl parts of the monoalkyl, dialkyl, trialkyl, or tetraalkyl ammonium ions each having one to four carbon atoms.

5. The process of claim 1, wherein the at least one alkyl sulfate surfactant is selected from the group consisting of sodium lauryl sulfate, potassium lauryl sulfate, ammonium lauryl sulfate, and mixtures thereof.

6. The process of claim 1, wherein the at least one fluoro monomer is vinylidene fluoride.

7. The process of claim 1, wherein the fluoropolymer is a copolymer of vinylidene fluoride and at least one additional monomer, wherein the copolymer is from about 71 to about 99 weight percent vinylidene fluoride and from about 1 to about 29 weight percent the second monomer.

8. The process of claim 1, wherein the fluoropolymer is a terpolymer of vinylidene fluoride and a second and third monomer selected from the group consisting of tetrafluoroethylene (TFE), trifluoroethylene, and hexafluoropropene (HFP).

9. The process of claim 8, wherein the fluoropolymer is a terpolymer of vinylidene fluoride, a second monomer, and a third monomer, wherein the terpolymer is at least about 71 weight percent vinylidene fluoride.

10. The process of claim 1, wherein the at least one alkyl sulfate surfactant introduced to the aqueous reaction media after polymerization is selected from the group consisting of sodium laurel sulfate, potassium laurel sulfate, ammonium laurel sulfate, and mixtures thereof.

* * * * *